United States Patent [19]

Shields

[11] 4,335,799
[45] Jun. 22, 1982

[54] SPEED GOVERNOR WITH BELOW DASHBOARD SERVOMOTOR

[75] Inventor: Neal G. Shields, Fort Worth, Tex.

[73] Assignee: Specific Cruise Systems, Inc., Fort Worth, Tex.

[21] Appl. No.: 170,113

[22] Filed: Jul. 18, 1980

[51] Int. Cl.$^3$ ............................................. B60K 31/00
[52] U.S. Cl. .................................... 180/175; 123/360
[58] Field of Search ............... 180/177, 176, 175, 170, 180/178, 179, 171, 172, 173, 174, 271; 123/360, 361, 352, 349, 350, 351

[56] References Cited

U.S. PATENT DOCUMENTS

| | | | |
|---|---|---|---|
| 2,809,708 | 10/1957 | Edwards | 180/171 |
| 3,481,422 | 12/1969 | Mueller et al. | 180/177 |
| 3,485,316 | 12/1969 | Slavin et al. | 180/176 |

Primary Examiner—Richard A. Bertsch
Assistant Examiner—Milton L. Smith
Attorney, Agent, or Firm—James E. Bradley

[57] ABSTRACT

A motor vehicle speed governor has features that make it advantageous for use with motor vehicles having flexible throttle cables. The speed governor has a vacuum responsive servo mounted in the passenger compartment for pulling on the rearward end of the throttle cable. A conduit extends from the vacuum servo to the engine manifold. The vacuum valve is connected into the conduit in the engine compartment for communicating the vacuum source with the servo. A vent valve is also mounted in the engine compartment in communication with the conduit for relieving the vacuum in the servo. Electronic controls are located in the passenger compartment for controlling the opening and closing of the vacuum and vent valves to govern the speed.

4 Claims, 2 Drawing Figures

SPEED GOVERNOR WITH BELOW DASHBOARD SERVOMOTOR

BACKGROUND OF THE INVENTION

This invention relates in general to speed governors for motor vehicles, and in particular to a speed governor advantageous for use with vehicles that have flexible throttle cables.

Many motor vehicles are equipped with speed governors, known as "cruise controls". The cruise control enables the driver to select a speed, which will then be automatically maintained by the control system. One general type employs a servomotor secured to the throttle at the carburetor and connected to a vacuum source of the engine. A vacuum valve opens the vacuum source to increase the vacuum in the servomotor for advancing the throttle. A vent valve selectively bleeds vacuum off, to allow the throttle to retract, it being drawn by its spring. An electrical control circuit senses the vehicle's speed and controls the vent and vacuum valves.

Another type of cruise control employs an electrical servomotor mounted in the passenger compartment next to the accelerator pedal. The electrical servomotor is similarly controlled by a control circuit, but has an electrical motor for moving the throttle.

The vacuum servomotor operates best if the throttle linkage between the carburetor and pedal is a stiff, solid rod. On acceleration, the servo can push the rod rearward, opening the throttle and pushing the accelerator pedal downward. Some vehicles, however, have flexible cables serving as the linkage between the throttle and pedal. On acceleration, there is a danger that the cable will bend or buckle when pushed rearward at the carburetor by the servomotor. The bending might cause the throttle to stick open.

Consequently, on cable throttles, the electrical servomotor mounted at the pedal would be preferable since it pulls the rearward end of the cable to advance the throttle instead of pushing the forward end. However it is more expensive. Mounting a vacuum servomotor at the pedal would have the disadvantage of increasing noise in the passenger compartment because of the operation of the vacuum and vent valves, normally attached to the servo.

SUMMARY OF THE INVENTION

It is accordingly a general object of this invention to provide an improved motor vehicle speed governor.

It is a further object of this invention to provide an improved motor vehicle speed governor particularly for use with vehicles having flexible throttle cables.

It is a further object of this invention to provide an improved motor vehicle speed governor using a vacuum servomotor and particularly advantageous for vehicles having flexible throttle cables.

In accordance with these objects, a vacuum servomotor is mounted in the passenger compartment next to the pedal. A conduit extends from the vacuum source of the engine to the servomotor. A vacuum valve is mounted in the conduit in the engine compartment for selectively providing vacuum to the servomotor. A vent valve is also mounted in the engine compartment in communication with the conduit for selectively exposing the conduit to atmosphere for relieving vacuum in the servomotor. The control means controls the vacuum and vent valves.

Positioning the servomotor at the accelerator pedal allows it to be used with flexible throttle cables, since it pulls on the rearward end of the cable, instead of pushing the forward end. Positioning the control valves in the engine compartment avoids increasing noise in the passenger compartment.

DESCRIPTION OF THE PREFERRED EMBODIMENT

Figure 1:
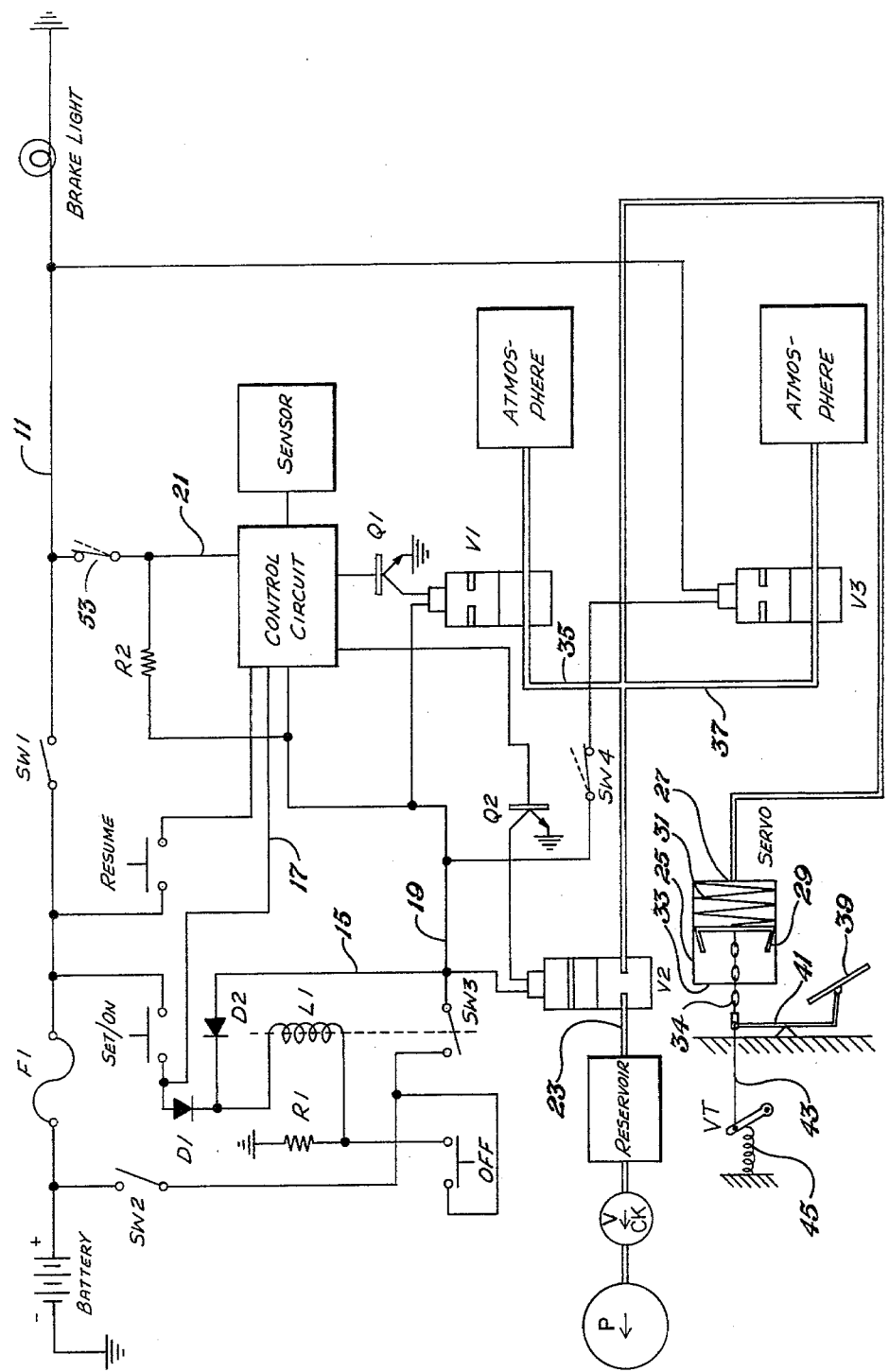
FIG. 1 is a schematic illustrating a speed governor constructed in accordance with this invention.

Referring to FIG. 1, the motor vehicle will have a brake line, wire or conductor 11 connected between a ground and the battery. A brake light and a brake fuse F1 are connected into brake line 11. Fuse F1 will open the circuit should the current in brake line 11 exceed a selected amount. A switch SW1 is interconnected into the brake line 11 and mounted in the passenger compartment so that it will close when the brake pedal 13 (FIG. 2) is pressed. This causes the brake line 11 to conduct, energizing the brake light.

The motor vehicle has an ignition switch SW2 that has one side connected to the battery. The opposite side of the ignition switch SW2 is connected to a relay switch SW3. A SET/ON switch, of a type that is normally off, and actuates momentarily by depressing, has one side connected to the brake line 11 between brake fuse F1 and brake switch Sw1. The other side is connected to the anode of a diode D1, whose cathode is connected to an inductor or relay L1. Relay L1 moves relay switch SW3 to a closed position when conducting. The opposite side of relay L1 is connected through a resistor R1 to ground. Relay switch SW3 is connected to an energizing circuit or line 15 that extends to the anode of a diode D2. The cathode of diode D2 is connected to the cathode of diode D1.

When relay switch SW3 is closed by relay L1, and the ignition switch SW2 is closed, current flows through the energizing circuit 15, relay L1, and resistor R1 to ground. This serves as the power means for the electronic control circuit. Relay switch SW3 is closed by momentarily depressing the SET/ON switch, which causes current to flow through brake fuse F1, relay L1, and resistor R1 to ground. Once switch SW3 is closed, it will remain closed, due to the current that it causes to flow through the relay L1, even though the SET/ON switch has moved back to the off position. Consequently, the relay L1 and relay switch SW3 serve as latching means for sustaining current flow in energizing line 15, when initiated by the momentary closing of the SET/ON switch.

An OFF switch of the type that is normally open, and closes by depressing, has one side connected to the line between resistor R1 and relay L1. The other side of the OFF switch is connected between ignition switch SW2 and relay switch SW3. If relay switch SW3 is closed, causing a voltage potential in the energizing line 15, depressing the OFF switch will cause the relay switch SW3 to open, since current through the battery will flow directly to resistor R1 through the OFF switch, bypassing relay L1 and causing relay switch SW3 to open.

The control circuit is a conventional electronic circuit that senses speed and provides a signal either to increase, to decrease, or to hold the speed in response thereto. The control circuit is an integrated circuit, and the preferred type is a Motorola circuit no. 14460. The sensor may be of various types, connected into the transmission, or the speedometer cable, for counting pulses received due to rotation of a member as the vehicle rolls. The control circuit has one line 17 connected between the control circuit and a point between the SET/ON switch and diode D1. This line causes the control circuit to set the speed when the SET/ON switch is depressed. A second line 19 is connected between the control circuit and the energizing line 15, providing power to the control circuit. The control circuit has a third line 21 connected between it and the brake line 11. Line 21 provides the means for receiving a signal when the brake switch SW1 is closed. A resistor R2 is connected between lines 19 and 21, bypassing the control circuit. A RESUME switch is connected between the control circuit and a point in brake line 11 between fuse F1 and brake switch SW1. The RESUME switch is normally off or open.

The control circuit has an output line that is connected to the base of a transistor Q1. The emitter of transistor Q1 is connected to ground, while the collector of transistor Q1 is connected to a solenoid actuated vent valve V1. The other side of the solenoid of vent valve V1 is connected into line 19. If the control circuit provides a signal to transistor Q1, the transistor Q1 will complete its circuit to ground, actuating the vent valve V1 from its normally open position shown in FIG. 1 to a closed position (not shown).

The control circuit has another output line that is connected to the base of a transistor Q2. The emitter of transitor Q2 is connected to ground while the collector is connected to a solenoid actuated vacuum valve V2. The other side of the solenoid of the vacuum valve V2 is connected to line 19. If the control circuit provides a signal to transistor Q2, it will conduct, providing a ground for the solenoid of V2, causing the valve to move from its normally closed position, shown in FIG. 1, to an open position (not shown).

A safety valve V3 is also solenoid actuated, having one side connected into a safety line extending into line 19. A normally closed safety switch SW4 is interconnected into the safety line. Safety switch SW4 is positioned so as to open when the brake pedal 13 is depressed. The other side of the solenoid of the safety valve V3 is connected to brake line 11, between brake switch SW1 and the brake light. Grounding is provided through the brake light. Thus if a voltage potential exists in line 19, and the brake pedal 13 is not depressed, safety valve V3 will move from the normally open position, shown in FIG. 1, to a closed position (not shown).

The vacuum system of the preferred embodiment includes a source of vacuum, labeled P, which is the engine manifold. A reservoir is mounted in a vacuum conduit 23 extending from the manifold P. A check valve is mounted between the manifold P and reservoir to prevent the flow of air if the pressure in manifold P is higher than in the reservoir. The vacuum valve V2 is a two position valve that selectively opens and closes conduit 23. Vacuum valve V2 is located in the engine compartment between the reservoir and a servo.

Figure 2:
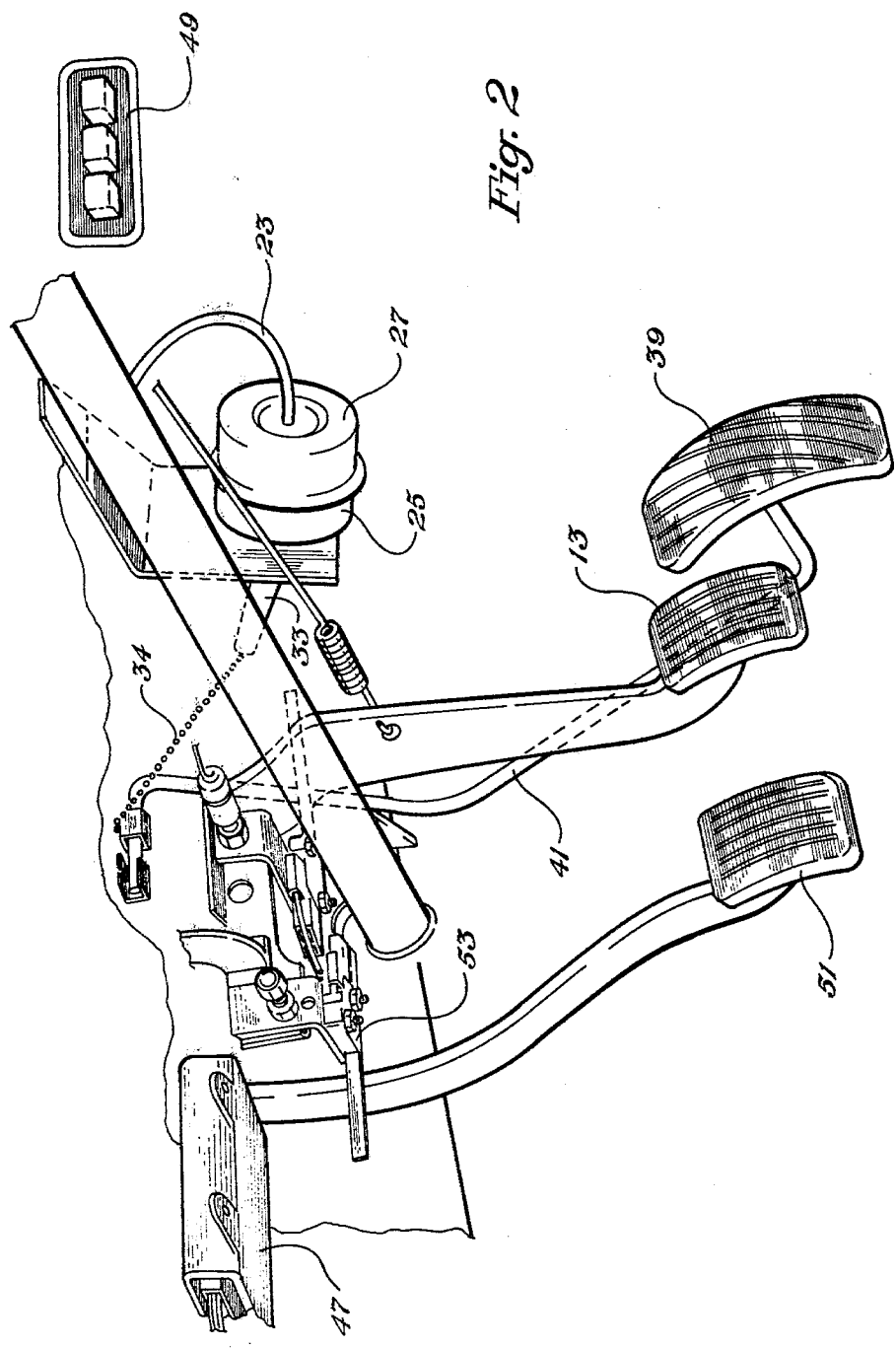
FIG. 2 is a perspective view of the portions of the speed governor of FIG. 1 that are located in the passenger compartment below the dashboard.

The servo, however, is located in the passenger compartment below the dashboard, as indicated in FIG. 2. The servo includes a chamber or housing 25 having a rearward end 27 connected to the vacuum conduit 23. A piston 29 is reciprocally carried in the chamber 25. A coil spring 31 urges the piston toward the forward end 33 of the chamber 25. The directions "forward" and "rearward" refer to normal driving directions. A servo linkage comprising a flexible chain 34 is connected to the forward end of the piston 29 and extends through an aperture provided in the forward wall 33 to the rearward end of the carburetor throttle cable 43. The carburetor throttle is indicated symbolically as VT, and is biased forwardly to the idle position by a spring 45. Placing vacuum valve V2 in the energized, open position, provides the vacuum in chamber 25, drawing piston 29 rearwardly, and opening throttle VT. Closing vacuum valve V2 causes the vacuum in the chamber 25 to hold, stopping any movement of the piston 29.

Vent valve V1 is also a two position valve. It is connected to a conduit 35 that connects with conduit 23 between the vacuum valve V2 and the servo. Vent valve V1 is mounted in the engine compartment, and has its opposite side leading to atmosphere. If in the open position, as shown in FIG. 1, vent valve V1 will prevent any vacuum from existing in the chamber 25 of the servo since it will communicate the chamber to atmosphere. If in the closed position, vent valve V1 will allow vacuum to exist in the servo.

Safety valve V3 is also a two position valve that is normally open to atmosphere and is located in the engine compartment. Safety valve V3 is connected to a conduit 37 that extends into the conduit 23 between the vacuum valve V2 and the servo. If in the open position, as shown, the safety valve V3 will prevent any vacuum from existing in the servo, regardless of the position of the vent valve V1, since it will communicate the servo to atmosphere. If in the closed position, it will allow vacuum to exist in the servo.

Referring also to FIG. 2, the accelerator pedal 39 includes a rod 41 that extends to the rearward end of the throttle linkage member or cable 43 (FIG. 1). Throttle linkage 43 may either be a flexible cable or it may be a rigid rod. In either case, under normal driving operation, when the driver presses the accelerator pedal 39 downwardly and forwardly, the pedal pulls on the rearward end of throttle cable 43, opening the carburetor throttle VT. The servo linkage 34 is connected directly between the top of rod 41 at the rearward end of throttle cable 43, and the servo piston 29. Consequently, when the piston 29 moves rearwardly, the servo linkage 34 draws the throttle linkage 43 rearwardly. This pulls accelerator pedal 39 downward, and opens throttle VT. Spring 45 (FIG. 1) urges accelerator pedal 39 rearwardly and upwardly when the throttle VT is released.

A housing 47, shown in FIG. 2, is mounted to the motor vehicle in the passenger compartment, for containing the control circuit, and associated electrical and electronic equipment for the speed governor. A set 49 of three buttons or keys is mounted in the passenger compartment for selectively actuating the OFF, SET-/ON and RESUME switches. A clutch pedal 51 is shown in FIG. 2, although the system operates with motor vehicles that do not have clutch pedals. If a clutch pedal 51 is in the motor vehicle, a clutch switch 53 is mounted in series in line 21 (FIG. 1) and is normally closed. When the clutch is depressed, it opens causing resistor R2 to cause positive current to flow to the control circuit through line 21. This causes the cruise control to shut off.

In operation, the speed governor is actuated as the vehicle is moving, and with the ignition switch SW2 closed. The SET/ON switch is depressed when the vehicle is at the desired speed. This signals the control circuit and energizes the relay L1, closing relay switch SW3. Current will then flow through the energizing line 15, relay L1, and resistor R1 to ground. The SET/ON switch will spring back to the off position shown in FIG. 1. Power to the control circuit will be provided through line 19.

The control circuit will sense the speed through the sensor. If the speed drops from the time when the SET/ON switch was depressed, a signal will be provided from the control circuit to transistor Q2. This allows the valve V2 to open, creating vacuum in conduit 23. At the same time, the control circuit signals transistor Q1 to close the vent valve V1. Also the safety valve V3 will have moved to the closed position, since current will be flowing through the safety switch SW4. With both the vent valve V1 and safety valve V3 closed, vacuum will be drawn in the chamber 25, moving piston 29 rearwardly, and advancing the throttle VT through the servo linkage 34.

At the desired speed, the control circuit will signal the valve V2 to close while maintaining the vent valve V1 closed, holding the piston 29 at a particular position. If the speed begins to exceed the set speed, such as when traveling down a hill, the control circuit will signal transistor Q1 to turn off, causing the vent valve V1 to spring back to its normally open position, relieving the vacuum in the chamber 25. Consequently, the vacuum valve V2 serves as an acceleration means for advancing the throttle while the vent valve V1 serves as deceleration means for allowing the throttle to retract.

If the brake pedal is depressed, brake switch SW1 will close. This enables current to flow through fuse F1 and through the brake light to ground. The voltage potential at line 21 thus equals the voltage potential of line 19, signaling the control circuit to turn off transistors Q1 and Q2. This enables the vent valve V1 to open and the vacuum valve V2 to close, causing the servo to allow the throttle to retract to the idle position. At the same time, and independently of brake switch SW1, safety switch SW4 will open due to the movement of the brake pedal 13. This breaks the circuit through the safety valve V3, causing it to shift back to its normally open position, also exposing the vacuum of the servo to atmosphere. The relay switch SW3 remains closed and is unaffected by movement of the brake pedal 13.

When the brake pedal 13 is released, the safety switch SW4 will again close and the brake switch SW1 will again open. This allows current to flow through the solenoid of the safety valve V3, shifting it to its closed position. The control circuit will not provide current to transistors Q1 and Q2 to accelerate, however, until the RESUME switch is depressed, providing voltage through the brake line 11 to the control circuit. Once depressed, the control circuit will resume its control of the vent valve V1 and vacuum valve V2. To turn off the system, the OFF switch is depressed, causing current to cease flowing through the relay L1, and opening the relay switch SW3. To reactuate the control circuit, the SET/ON switch must again be pushed.

The invention has significant advantages. Placing the servo in the passenger compartment allows it to be positioned so that it can pull on the rearward end of the throttle linkage as opposed to the prior art servo, which is located in the engine compartment and pushes on the forward end of the throttle linkage. Pulling avoids kinks and the possibility of having the throttle stick open with flexible throttle cables. Positioning the vacuum valves in the engine compartment prevents noise that would otherwise occur if the valves were located in the passenger compartment.

While the invention has been shown in only one of its forms, it should be apparent to those skilled in the art that it is not so limited but is susceptible to various changes and modifications without departing from the spirit of the invention.

I claim:

1. In a motor vehicle having separate engine and passenger compartments, a vacuum source in the engine compartment and a throttle linkage extending from a carburetor into the passenger compartment, an improved speed governor system, comprising in combination:
   servo means, mounted in the passenger compartment for pulling on the rearward end of the throttle linkage in response to varying vacuum;
   a conduit extending from the vacuum source to the servo means;
   a vacuum valve means mounted in the conduit in the engine compartment for selectively communicating the vacuum source with the servo means;
   a vent valve means mounted in the conduit in the engine compartment for selectively communicating the conduit to atmosphere; and
   control means for selectively opening and closing the vacuum valve means and vent valve means in response to the vehicle's speed, to control the vacuum in the servo means and the speed of the vehicle.

2. The system according to claim 1 wherein the servo means comprises:
   a chamber having a rearward end in communication with the conduit and a forward end containing an aperture;
   a piston reciprocally carried in the chamber;
   spring means for urging the piston away from the rearward end; and
   a servo linkage connected to the piston, extending through the aperture, and connected to the rearward end of the throttle linkage.

3. The system according to claim 2 wherein the servo linkage is flexible.

4. In a motor vehicle having separate engine and passenger compartments, a vacuum source in the engine and a throttle linkage extending from a carburetor into the passenger compartment, an improved speed governor system comprising:
   a chamber mounted in the passenger compartment and having forward and rearward ends;
   a piston reciprocally carried in the chamber;
   spring means for urging the piston away from the rearward end of the chamber;
   a servo linkage connected between the piston and the rearward end of the throttle linkage for drawing the throttle linkage rearwardly as the piston moves rearwardly;
   a conduit extending from the vacuum source and in communication with the rearward end of the chamber;
   a vacuum valve means mounted in the conduit in the engine compartment for selectively communicating the vacuum source with the chamber to increase the vacuum in the chamber;

a vent valve means, mounted in the conduit in the engine compartment, for selectively communicating the conduit with the atmosphere, to reduce the vacuum in the chamber; and control means for selectively opening and closing the vacuum valve means and the vent valves means in response to the vehicle's speed to control the vacuum in the chamber and the speed of the vehicle.

* * * * *